P. F. BRODERICK & J. H. HARTER.
VEHICLE WHEEL.
APPLICATION FILED JUNE 9, 1915.
1,216,937.
Patented Feb. 20, 1917.
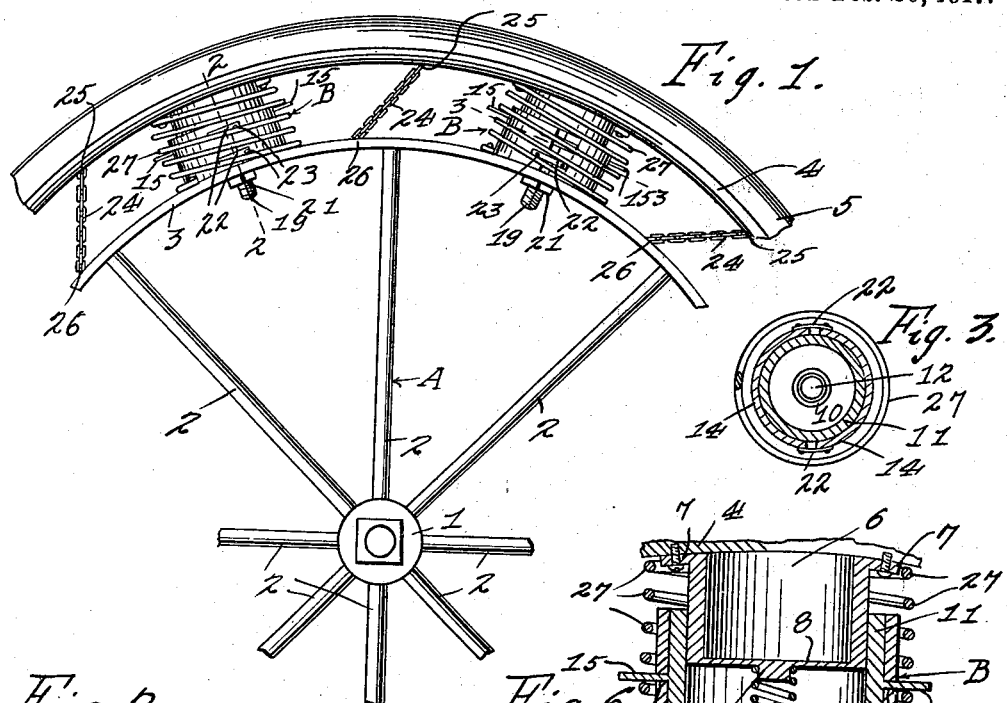
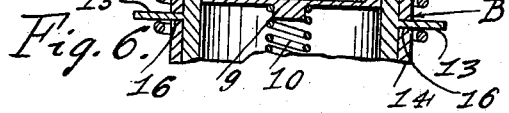
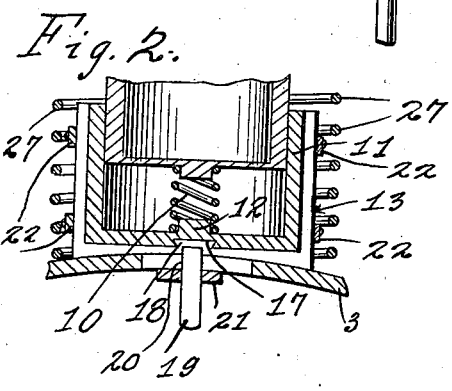
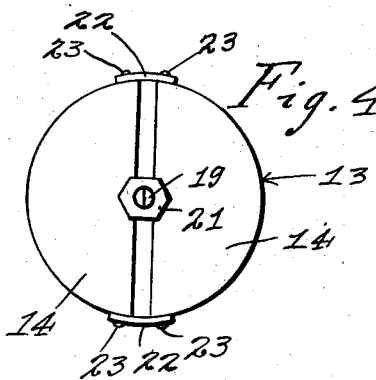
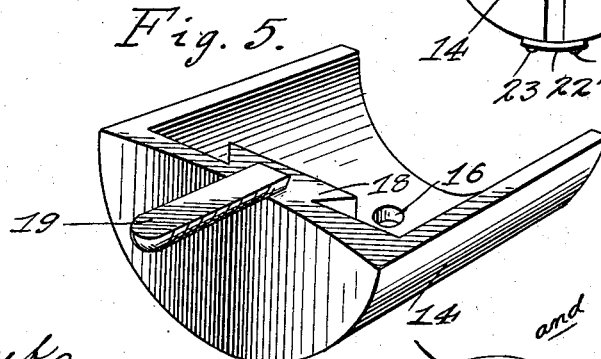
Witnesses
Inventors
P. F. Broderick,
J. H. Harter.
By
Attorneys

UNITED STATES PATENT OFFICE.

PATRICK F. BRODERICK AND JACOB H. HARTER, OF BRIDGEPORT, CONNECTICUT.

VEHICLE-WHEEL.

1,216,937. Specification of Letters Patent. Patented Feb. 20, 1917.

Application filed June 9, 1915. Serial No. 33,133.

*To all whom it may concern:*

Be it known that we, PATRICK F. BRODERICK and JACOB H. HARTER, citizens of the United States, residing at Bridgeport, in the county of Fairfield, State of Connecticut, have invented certain new and useful Improvements in Vehicle-Wheels; and we do hereby declare the following to be a full, clear, and exact description of the invention, such as will enable others skilled in the art to which it appertains to make and use the same.

This invention relates to certain novel and useful improvements in vehicle wheels, and has particular application to a resilient or cushioned wheel adapted for use in connection with motor vehicles, trucks, motor cycles and the like.

In carrying out our invention, it is our purpose to provide a wheel which will possess the necessary resiliency to enable it to be employed in place of the ordinary wheel commonly equipped with a pneumatic tire, as by the use of our invention, not only are the shocks and jars to which the vehicle is subjected in travel, cushioned or absorbed, but the disadvantages incident to the ordinary pneumatic tire, such as liability to puncturing, rupturing and abrasion is obviated.

Still a further object of our invention is the provision of a cushioned or resilient wheel of this character which will embody the desired features of efficiency, strength and durability, coupled with simplicity in construction, so that it may be manufactured and marketed at a relatively low cost.

With the above recited objects and others of a similar nature in view, our invention consists in the construction, combination and arrangement of parts set forth in and falling within the scope of the appended claims.

In the accompanying drawings:

Figure 1 is a view in side elevation of such a portion of our improved wheel as is necessary to show the invention.

Fig. 2 is a cross sectional view taken on the line 2—2 of Fig. 1.

Fig. 3 is a horizontal sectional view taken on the line 3—3 of Fig. 1.

Fig. 4 is a bottom plan view of the two-part sleeve of one of the shock absorbing devices.

Fig. 5 is a perspective view of one of the half sections of the sleeve of the shock absorbing device.

Fig. 6 is a detail view.

Referring now to the accompanying drawings in detail, the letter A indicates our improved wheel as an entirety, having the hub 1, the radial spokes 2, the inner rim 3 to which the outer ends of the spokes are fastened, and the outer rim 4 carrying an ordinary solid tire 5. Between the inner rim 3 and the outer rim 4 we locate a series of spaced shock absorbing devices, each of which is indicated as an entirety by the letter B. Each shock absorbing device includes a cylindrical plunger 6 having outwardly extending ears 7 at the upper end thereof, by means of which the plunger is bolted to the inner face of the outer rim 4. From the bottom face 8 of the plunger projects a stud 9 which is adapted to confine the upper end of the coil spring 10. The plunger 6 is adapted to fit and slide in a companion member 11 which is tubular and cylindrical in form, and extending inward from the bottom of this member is a central stud 12 which is adapted to hold and confine the lower end of the coil spring 10. Thus it will be seen that the plunger 6 is adapted to telescope in the cylinder 11, the spring 10 being interposed between the plunger and the cylinder to assist in absorbing shocks and jars. Surrounding each cylinder 11 is a two-part sleeve or casing 13, each semi-cylindrical member of the casing being shown at 14, and these members when assembled are adapted to form a tubular cylindrical sleeve enveloping the cylinder 11. This cylinder 11, as will be seen, has projecting outward from the side walls thereof oppositely disposed lateral pins 15, and when the members 14—14 of the casing are fitted around the cylinder 11, these pins are adapted to project outward through apertures 16 formed in the side wall of the casing 13. Furthermore, the bottom wall of the cylinder 11 is formed with an open-faced dove-tail slot 17 extending entirely thereacross, and into this slot are adapted to fit the dove-tail blocks or tongues 18 depending from the bottom faces of the sections 14 of the casing or sleeve 13, so that when the sleeve 13 is fitted around the cylindrical member 11, these dove-tail tongues or blocks will interlock in the slot 17 and hold the cylindrical member 11 in position in such casing. Formed integral with and depending from the dove-tail blocks or tongues 18 are the shank sections of the two half-bolt sections 19, which are exteriorly threaded, and are adapted to form a complete bolt when the two sections of the casing are fitted together. This split bolt when assembled is adapted to be passed through an elongated aperture 20 in the inner rim, and a nut 21 may be threaded into the end of the split bolt. In order to unite the two sections 14 of the casing 13 in assembled operative position, we employ small metallic strips or plates 22 fastened at opposite ends by screws or other means 23, to the side walls of the sections 14, these strips uniting the two sections when the latter are assembled and it is, of course, to be understood that the strips may be readily removed when it is desired to disassemble the casing. Furthermore, these strips may be in the nature of bands or the like, and adjustable to cause the members 14 of the sleeve or casing to fit properly in position.

As will be seen by reference to Fig. 1, these shock absorbing devices B are adapted to be arranged in a spaced series around the wheel and between the inner and outer rims thereof, and located in the space between each shock absorbing device is a small flexible chain 24, one end of which is connected at 25 to the outer rim, while the outer end is connected at 26 to the inner rim, these chains being intended to further assist in holding the two rims against shifting or working out of position relative to each other. In other words, they assist during the travel of the vehicle in preventing the gripping of the outer rim and its connected parts and the consequent damaging lateral strain or twisting action on the shock absorbers.

If desired, a relatively large coil spring 27 may be coiled about each shock absorber, the outer end of this spring being fastened to the outer rim, while the inner end of the spring is fastened to the inner rim. This large spring will act to absorb shocks and jars, and thus increase the resilient or cushioning action of the wheel.

From the above description, taken in connection with the accompanying drawings, the construction and operation of our improved vehicle wheel will be readily appreciated. It will be seen that as the plunger members 6 of each shock absorber has a sliding cushion action in the cylinder in which the plunger telescopes, the jars to which the wheel is subjected will be absorbed and minimized.

While we have herein shown and described one particular embodiment of our invention, we wish it to be understood that we do not confine ourselves to all the precise details of construction herein set forth by way of illustration, as modification and variation may be made without departing from the spirit of the invention, or exceeding the scope of the appended claims.

What we claim is:

1. In a vehicle wheel, a pair of concentric rims, a plunger member attached to one of said rims, a tubular member connected with the other rim and adapted to slidingly receive the plunger member, a resilient member interposed between the plunger and the bottom of the tubular member, a sectional casing surrounding the tubular member and connected therewith, and means for fastening the sectional casing to one of the rims.

2. In a vehicle wheel, a pair of spaced concentric rims, a plunger member fastened to one of said rims, a tubular member in which said plunger lies, a resilient element interposed between the plunger and the tubular member, a sectional casing surrounding the tubular member, a tongue at one end of each section of the casing adapted to slidingly interlock with a groove in the bottom of the tubular member, and a bolt projecting from the bottom of the sectional casing, and extending through one of said rims for fastening the casing to the rim.

3. In a wheel, the combination with an inner rim and an outer rim concentric therewith, of a cylindrical plunger fastened to the outer rim, a tubular cylinder in which the plunger telescopes, a coil spring interposed between the plunger and the end of the cylinder, laterally extending projections carried by the cylinder, a two-part casing surrounding the cylinder and having apertures through which the projections of the cylinder pass, a dove-tail tongue at the bottom of each part of the casing adapted to interlock in a dove-tail groove formed in the bottom of the cylinder, a split bolt section depending from the bottom of each part of the casing, the sections of the split bolt when united being adapted to extend through an opening formed in the casing end, a nut threaded onto the united bolt, and a relatively large coil spring interposed between the outer rim and the inner rim and surrounding the casing and the parts inclosed thereby.

In testimony whereof, we affix our signatures in the presence of two witnesses.

PATRICK F. BRODERICK.
JACOB H. HARTER.

Witnesses:
Louis J. Bragur,
Wilhelmina Baker.

Copies of this patent may be obtained for five cents each, by addressing the "Commissioner of Patents, Washington, D. C."